July 25, 1933.  L. B. GREEN  1,920,013

BEVERAGE WATER HEATER

Filed Aug. 10, 1932  3 Sheets-Sheet 2

Inventor:
Lee B. Green
by Albert Scheible
Attorney

July 25, 1933. L. B. GREEN 1,920,013
BEVERAGE WATER HEATER
Filed Aug. 10, 1932    3 Sheets-Sheet 3

Inventor:
Lee B. Green
by Albert Scheible
Attorney

Patented July 25, 1933

1,920,013

UNITED STATES PATENT OFFICE

LEE B. GREEN, OF LAKEWOOD, OHIO, ASSIGNOR TO THE GLOBE MACHINE & STAMPING COMPANY, OF CLEVELAND, OHIO, A CORPORATION OF OHIO

BEVERAGE WATER HEATER

Application filed August 10, 1932. Serial No. 628,168.

My invention relates to the class of liquid heaters arranged for heating liquid to a predetermined temperature and thereafter storing the same, and for automatically replenishing the store of heated liquid whenever any part of the latter has been drawn off.

In my copending application #600,877 filed March 24, 1932, I have disclosed an electrically actuated water heater of this class designed for connection to a water pipe and adapted for use as a beverage water heater in lunch rooms or other places where such a water-pipe connection can conveniently be made.

In one of its major objects, my present invention aims to provide a beverage water heater (or liquid heater for other purposes) which will require no connection to any supply of liquid under pressure, thereby affording a portable appliance suitable for use on total tables or household dining tables, and into which appliance the cold liquid can be poured manually (both initially and whenever needed later on) without chilling the stored hot liquid.

In another major object, my invention aims to provide a manually refillable liquid heater in which the heating effect is concentrated on a quite small quantity of the liquid in proportion to the capacity of the receptacle into which the cold liquid is poured, so as to decrease the time required for heating the liquid to the desired temperature.

In a further major object, my invention aims to provide a liquid heater of the aforesaid type, in which the heating action will be automatically discontinued whenever the stored hot liquid has reached a predetermined temperature, so as to avoid both an overheating of this stored liquid and a waste of heat on still available cold liquid.

With the arrangement disclosed in my aforesaid application #600,877, the liquid while being boiled is freely exposed to air in the upper portion of the casing of the appliance, and the heating member is immersed in a quantity of liquid of relatively large volume in proportion to the surface area of the heating member.

Under these conditions, the amount of time required by such a beverage water heater for initially filling the hot-water-storing chamber with hot water, although much less than the time required with water heaters of the ordinary coffee urn type, is nevertheless undesirably long.

In commercial practice, this is not objectionable when the hot-water storing chamber is so large in proportion of the rate of the water heating that this chamber is not likely to be entirely emptied during ordinary use, and particularly since the restaurant attendants would start the operation of the heater before each meal time. However, for dining table use, it is highly desirable that the coffee set should not be brought in until the time for the coffee or tea is approaching, and also desirable to have the water heater so speedy that the hot-water storing capacity will not need to be many times greater than that of the receptacle into which the cold water is poured.

My present invention aims to accomplish these desirable objects by feeding the cold water in a thin stream over the surface of the electric heater so as to speed the heating of the water, and by automatically reducing the rate of the water feeding as the temperature of the water rises, thereby speeding the heating and reducing the general size of the appliance in proportion to its liquid capacity. In addition, my invention aims to provide means whereby the heated water is transferred to a hot-water storing chamber at such a rate that nearly all of the adequately heated water is always in that chamber, and whereby vapor pressure is employed for expediting this transfer of water.

In another important object, my invention aims to provide this expedited heating while also de-aerating the water so as to improve the palatability of the resulting beverages; and provides a liquid heater construction which will accomplish this object without causing any considerable amount of the eliminated air to pass into the unheated water during the ordinary operation of the appliance, and also without causing the appliance to emit an appreciable amount of steam except momentarily when the cold water supply is exhausted.

In a still further object, my invention provides a liquid heater which will permit the receptacle for the cold liquid to be refilled after its contents have been converted into hot stored liquid, without chilling the stored hot liquid and without consuming any current for heating the fresh charge of cold liquid until hot liquid has been drawn from the storage chamber, thereby doubling the effective capacity of the appliance in proportion to its dimensions and also avoiding a waste of current.

In addition, my invention aims to provide a liquid heater which will accomplish the above recited objects with a simple and easily manufactured construction, which can easily be cleaned, and which will be entirely automatic in its operation.

Illustrative of the objects of my invention.

In the embodiment of Figs. 1 to 5 inclusive, the casing of my beverage water heater includes an upwardly tapering tubular base shell 1 having an inturned flange 2 at its upper end; a container (or main body portion) having a portion 3 A of its bottom 3 seated upon and brazed to the said flange and having a riser wall 4; and a cover 5 detachably seated on the upper end of the container, the cover being provided with an air vent, here shown as afforded by the bore of a tubular rivet 6 which secures a lifting knob 7 to the tip of the cover.

A faucet 8 is attached to the front of the lower portion of the container wall, and the container bottom desirably has its radially outer portion 3 A offset downwardly from the main portion 3 of that bottom, so that the inlet of the faucet is close to the level of the main bottom portion.

Extending through a central perforation 9 in the container bottom is the lower portion 10 A of an electric heating member, here shown as having its main portion 10 of an uprght cylindrical shape and having a peripheral flange 10 B seated on the container bottom. As here shown, this heating member has a central downwardly projecting stud 31 extending through the lower of two relatively inverted metal cups 11 and 12 which together afford a casing housing the wire terminals 13 of the heating member, and a nut 14 threaded on this stud underhangs the lower cup 11 to clamp the container bottom between the flange 10 B of the heating member and the said casing.

Extending within the container substantially coaxial with the heating member 10 for only part of the height of the container wall 4 is a riser tube 15. This riser tube has its lower end seated on the heater flange 10 A and provided with circumferentially spaced recesses 16 affording ports through which water can flow out of the said tube into the annular space between this tube and a tubular baffle 17 concentric with the riser tube. The baffle 17 is secured at its lower end to the container bottom, as for example by providing its lower end with a peripheral flange 17 A brazed to the container bottom 3, and this baffle extends to a lesser elevation than the riser tube 15.

Seated upon and preferably coaxial with the riser tube 15 is a cup-like receptacle for receiving the cold water, which receptacle has its bottom 18 fastened to the upper end portion of the said tube, desirably by brazing this bottom to a flange 15 A on the upper end of that tube. This receptacle desirably has the upper end of the receptacle wall 19 spaced downwardly from the upper end of the container wall 4 just enough to clear a cover flange 5 A which telescopes into the upper end of the said container wall 19 when the cover is attached, and I desirably fasten to the receptacle a handle 44 by which the receptacle and riser tube assembly may be lifted.

Figures 1, 3, 4, 5:
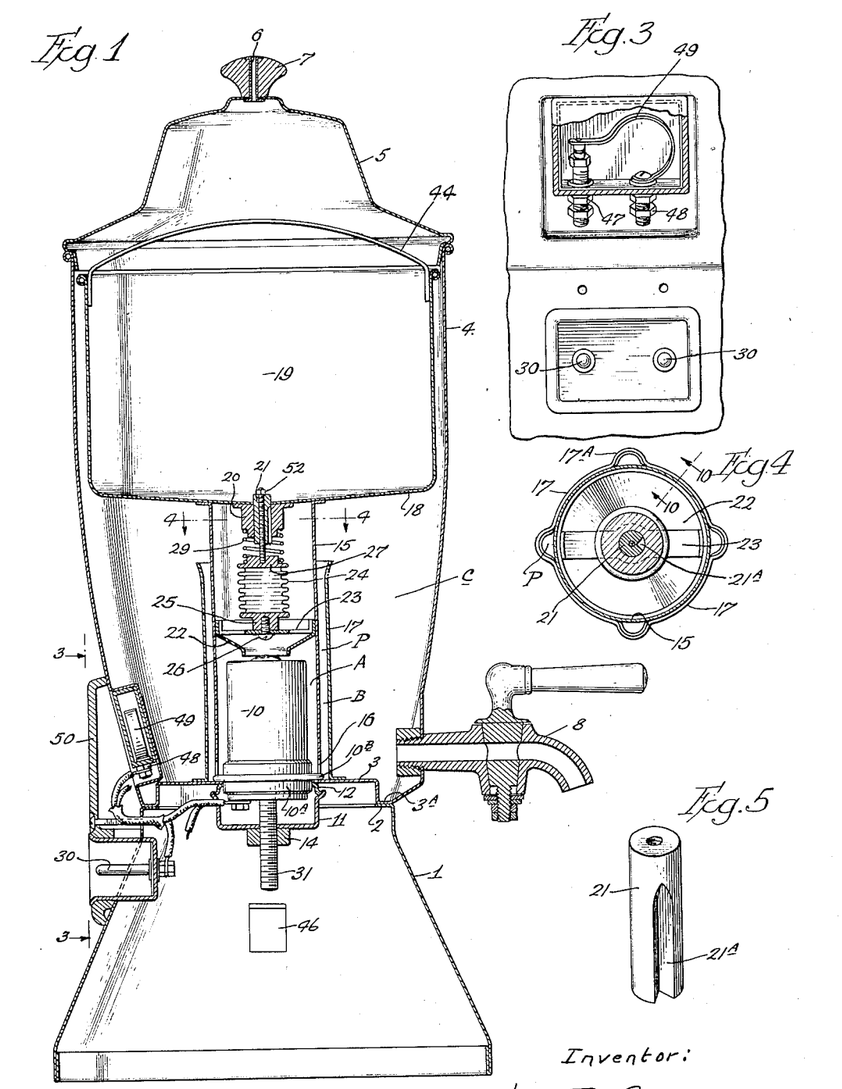
Fig. 1 is a central vertical section through a beverage water heater, with some portions shown in elevation.
Fig. 3 is a fragmentary rear elevation, taken from the line 3—3 in Fig. 2, with the cover for the thermostat housing detached.
Fig. 4 is a fragmentary horizontal section, taken along the line 4—4 of Fig. 1.
Fig. 5 is an enlarged perspective view of the metering pin shown in Figs. 1 and 2.

While a completely cylindrical tube might be employed for the baffle 17 if its bore was only slightly larger than the exterior diameter of the riser tube 15, it is important for the purposes of my invention that the total cross-sectional area of the hot-water guiding space between these members should be quite a small fraction of the cross-sectional area of the bore of the heater-housing riser tube. To secure such a proportion without an undue risk of clogging and without requiring a commercially undesirable exactness in the dimensions of the parts, I desirably employ for this baffle a metal tube into which the riser tube will fit freely, and form the baffle tube with outwardly bowed upright portions 17 A (as shown in Fig. 4) to afford tubular riser passages P of small total cross-section in proportion to the cross-sectional area of the riser tube 15.

Figure 2:
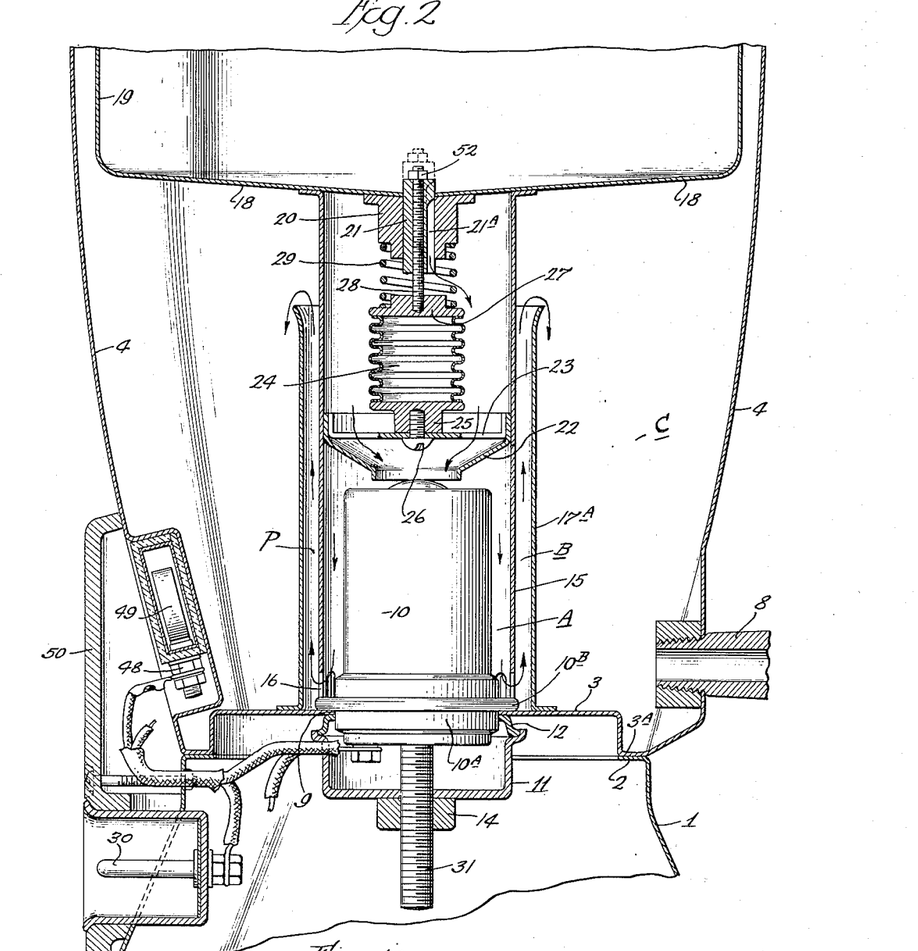
Fig. 2 is an enlargement of a portion of Fig. 1, with more portions shown in section.

The receptacle bottom 18 has a central perforation affording a discharge outlet from the receptacle to the interior of the heater-housing riser tube, which outlet is controlled by a movable valve member. As shown in Figs. 1 and 2, this valve member is an upright metal cylinder slidably fitting the bore of an upright valve body 21 which underhangs and is brazed to the receptacle bottom 18 coaxial with the said outlet, this cylinder having in one side thereof an upright groove 21 A which ends below the top of the said valve member so as to leave the upper end portion of that member entirely cylindrical.

Freely overhanging the heating member 10 and fastened to the riser tube 15 is an upright funnel 22 which compels the descending water to flow upon the top of the heating member, and a thermostat support 23 here shown as a spider having its arms secured to the upper portion of the funnel. Operatively interposed between this thermostat support 23 and the valve member 20 is a thermostatic member, here shown as comprising metal bellows portion 24 sealed at its lower end to a knob 25 secured (as by a screw 26) to the disk 22 and sealed at its upper end to a bellows top 27, a small quantity of ether or other suitable volatile liquid being disposed within the bellows to "load" the bellows.

Connecting the bellows top with the movable valve member 20 is a threaded stud 28 which is clinched to the bellows top and normally locked to the said valve member by a nut 32, so that the vertical spacing of the valve member from the bellows can be adjusted by rotating the valve member before the nut is tightened. A compression spring 29 interposed between the valve body or valve guide 21 and the bellows top 27 continually presses the bellows top downward and resists the expansion of the bellows; and with the locknut 32 disposed for engaging the upper end of the movable valve member 21, the adjustment of this valve member can readily be made from the top.

With this adjustment made so that the cylindrical upper portion of the valve member is within the bore of the valve body 21 when the appliance is cold, this valve member shuts off the connection from the receptacle to the heater-housing riser tube when my water heater is not in use, so that the initial charge of cold water in the receptacle will remain entirely in this receptacle until current is supplied to the heating member. When the electric connection is made, as by attaching a current supply cord to the usual exterior terminals 30, the heating member 10 quickly warms the air within the riser tube sufficiently to expand the bellows and raise the valve member. Water then flows through the groove 21 A in the valve member over the bellows member and through the ports 23 in the bellows supporting disk 22; and owing to the relatively small cross-section of the said groove this water flows initially down over the heating member in so thin a film as to be boiled almost instantly, so that only a quite short time elapses before the bellows expand and raise the valve member 21 to the open position shown in dotted lines in Fig. 2.

Water then flows from the receptacle through the valve groove 21 A in a slender stream which subdivides by splashing over the bellows member and is guided by the funnel 22 to flow as a thin film over the heating member 10. Consequently, the distribution of the water over this heater initially evaporates water and thereafter heats more of the water as this accumulates at a common level within the interconnected lower portions of the riser tube 15 and the upright passage P between that tube and the tubular baffle 17. Since the recesses 16 which afford the communication between the interior of the riser tube and the annular space B between that tube and the baffle 17 are at the lower edge of the riser tube, water is then heated directly by the heating member while flowing downward through the annular space A around the heating member and also by conduction through the riser tube and the baffle while flowing upwards within the upright hot-water feed passages P.

During this almost instantaneous heating of the water within the lower portion of the riser tube, water vapor (together with air boiled out of the water) accumulates in that tube. But the quite small cross-section of the valve groove 21 A cooperates with the head of the cold water (both in that groove and above the valve within the receptacle) to prevent such vapor from bubbling past the valve into the receptacle, so that the vapor pressure within the riser tube 15 forces the hot water up the feed passages P and causes the hot water to discharge into the annular hot-water storing space C (between the baffle and the riser wall 4 of the container) while the level of water within the riser tube may be far below the top of the heating member.

By thus maintaining only a relatively small height of water within the riser tube (in proportion to the height of the tubular baffle) and by proportioning the wattage of the electric heating member so that it will adequately heat cold water as rapidly as the water can flow through the valve, I concentrate the action of the heating member on a quite small volume of water during the normal operation of my appliance while cold water is in the receptacle. Consequently, my device will discharge almost the entire contents of the cold water receptacle into the annular hot-water storing chamber C in a much shorter time than this could be effected if the heating member were immersed in a large body of water after the heretofore customary manner. Indeed, I have found in practice that my appliance when employed for heating beverage water will boil the entire contents of the cold water receptacle and transfer almost all of the boiled water to the hot-water storing chamber C in a shorter time than would be required for even bringing the same quantity of cold water initially to its boiling point by a heating member of the same wattage immersed in the entire quantity of the cold water.

During the operation of my heater, additional cold water can be poured into the receptacle 19 to refill the latter either when empty or when still partly filled, but this added water (even if quite cold) will not appreciably affect the hot water in the annular storage chamber, or that between the riser tube and the baffle, because water can only flow past in a small stream the movable valve member. Whenever such added water has raised the level of the water in the hot-water storing chamber C above the upper end of the tubular baffle 17, the water within the riser tube 15 will still seek a common level with that surrounding this tube; and with sufficient water thus added (when little or no hot water has been withdrawn through the faucet 8) this liquid level may even extend up alongside the riser wall 19 of the cold water receptacle, so as to equalize it with the level of the cold water in the receptacle.

If the heating member were left continuously in operation, without any material withdrawal of hot water from the container or flow of cooler water past the heating member, the temperature of the hot water would soon be raised unduly, thereby not only making it too hot for beverage use but also causing some steam to issue through the vent 6. This visibility of steam would notify the user to shut off the current, but I desirably also provide auxiliary means for interrupting the action of the heating member whenever the temperature of the hot water in the annular storage chamber C is above a predetermined maximum.

Figure 12:
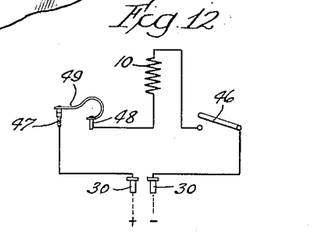
Fig. 12 is a diagram of the circuit connections.

For this purpose, Figs. 1, 2 and 3 show a thermostatic switch mounted on the exterior of the container within a detachable heat-insulating switch cover 50, which switch consists of a bimetallic strip 49 normally connecting two switch terminals 47 and 48. These switch terminals are connected in series with the electric heating member 10 across the plug terminals 30 to which the current-supply wires are attached, and in practice I also dispose a manual switch 46 in the same series circuit (as shown diagrammatically in Fig. 12) for shutting off the heating member manually when the use of my water heater is to be discontinued.

This switch may be mounted exteriorly of the container, so long as it is in heat-conducting relation to the latter, and is preferably adjacent to the lower portion of the container and approximately at about the same level with the inlet of the faucet 8 so as to be responsive to the temperature of the stored hot water even when the storage chamber C is nearly empty. With the thermostatic switch thus included in the circuit, this switch automatically interrupts the action of the heating member whenever the stored hot water is above the desired maximum temperature, regardless of the level of the hot water in that chamber. Consequently, a still continuing flow of cold water past the valve then will soon cool the thermostatic bellows 24 so as to contract the bellows and close the valve.

With the valve closed, and the action of the heating member discontinued, the conduction of heat from the stored hot water (including that within the baffle 17 and the heater-housing tube 15) is too slight to cool the water in the storage chamber C quickly, so that this stored water will remain for a considerable time at a temperature suitable for beverage purposes, while the water in the receptacle remains cold. Consequently, whenever cold water has been supplied in a quantity beyond that needed for consumption, no current is wasted in heating the greater portion of this excess of cold water, and no considerable amount of steam issues from the vent 8 in the cover for any period of time. However, whenever the temperature of the water in the storage chamber falls below that required for opening the thermostatic switch, this switch again closes and restarts the heating action. And, since hot water is also stored within both the baffle tube and the hot water passages P, only a quite short time elapses after such restarting of the heating member before adequately heated water again flows over the baffle into the storage chamber. Moreover, with the controls for both the valve and the temperature of the stored hot water entirely automatic, no skill or attention on the part of the user is required.

However, while I have heretofore described my invention in connection with the particular embodiment of Figs. 1 to 5 inclusive, I do not wish to be limited to the construction and arrangement thus described, since many changes might be made without departing either from the spirit of my invention or from the appended claims.

Figures 6, 7, 8, 9, 10, 11, 13, 14:
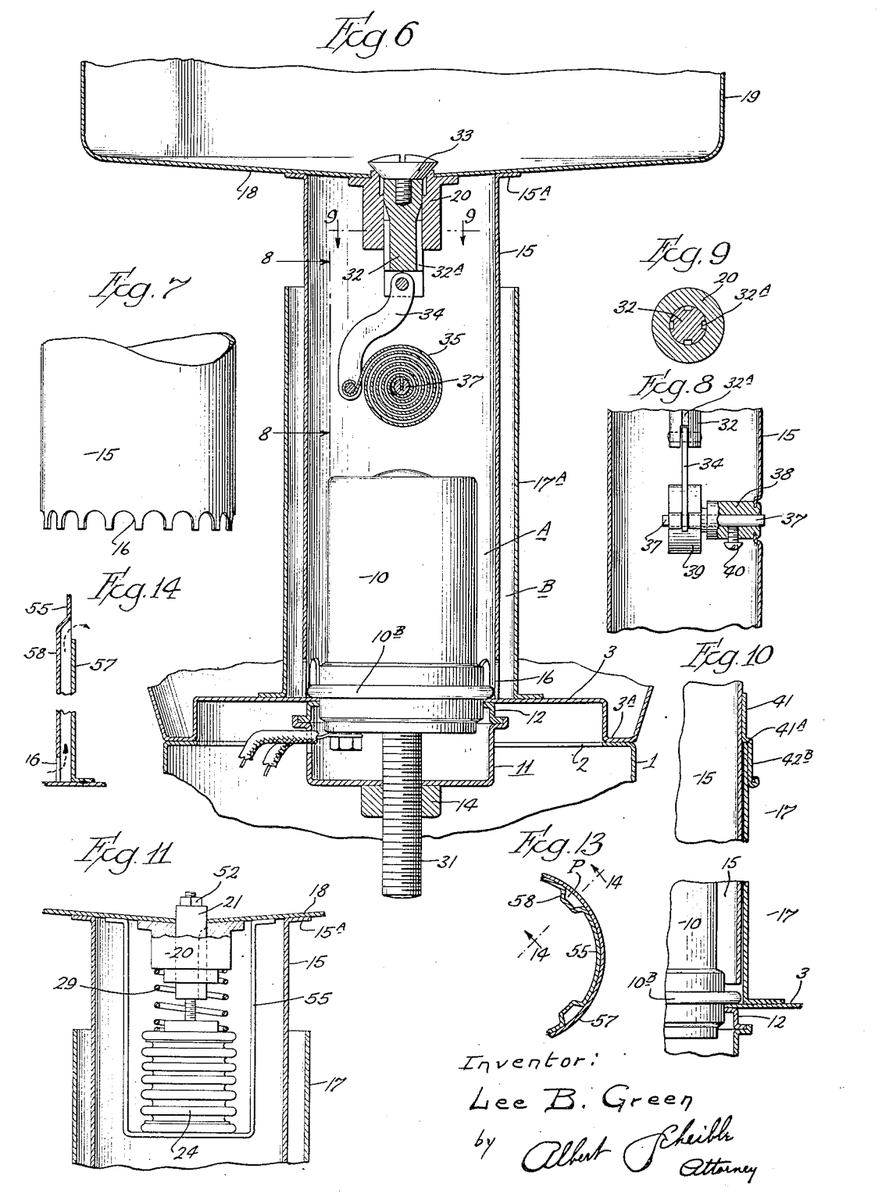
Fig. 6 is a fragmentary central and vertical section, allied to Fig. 2, showing a bimetallic coil controlling the metering valve and also showing this valve as affording a double seal.
Fig. 7 is an enlarged elevation of the lower portion of the heater-housing riser tube.
Fig. 8 is a fragmentary elevation taken from the line 8—8 in Fig. 6, with parts in section.
Fig. 9 is a horizontal section taken along the line 9—9 of Fig. 6 through the valve body and the metering pin.
Fig. 10 is a fragmentary vertical section, allied to a portion of Fig. 2, showing an alternative construction of the lower end of the heater-housing riser tube and showing this tube as supported by the tubular baffle which surrounds it, the section being taken along the line 10—10 of Fig. 4.
Fig. 11 is a fragmentary section, allied to a portion of Fig. 2, showing an alternative arrangement for supporting the thermostatic bellows and the movable member.
Figs. 13 and 14 are fragmentary sections, respectively allied to Figs. 10 and 4, showing a hot-water guide arrangement in which the baffle is a cylindrical tube and in which the heater-housing tube has grooves affording riser passages for the hot water.

For example, instead of having the thermostatic valve-controlling bellows 24 supported by a disk fastened to the heater-housing riser tube 15, the bellows may be supported by a metal strap 55 brazed to the bottom of 18, as shown in Fig. 11. Or, the thermostatic member may be a coiled bi-metallic strip 35 connected at its outer end by a link 34 to the movable valve member and at its inner end to a pin 36 supported by the riser tube, as in Fig. 6, in which case this pin 37 is rotatably mounted within a tube 38 so that the pin can be adjusted after loosening a clamping screw 40 which can be reached by a screwdriver through the lower end of the riser tube. However, with each form of thermostatic member, I preferably make this of a smaller maximum horizontal section than the heating member, so that water will also strike the top of the heating member to expedite the initial heating.

The shaping of the movable valve member and of parts of the valve body which guides it can also be varied. Thus, Fig. 6 shows the movable valve member 32 as provided with a plurality of longitudinal surface grooves 32 A open only at their lower ends, and shows the upper end of the valve body 20 as affording a flaring seat for a screw 33 fastened to the upper end of the said member. In this case, the engagement of the head of the screw with the said seat affords a seal (in the illustrated closed position of the valve) in addition to that afforded by the ungrooved part of the movable valve member.

So also, the means for supporting the heater-housing riser tube 15, for centering this tube with respect to the tubular baffle 17, and for permitting liquid to flow from the lower portion of the riser tube into the baffle may be varied. For example, Fig. 10 shows the riser tube as supported from the baffle 17 by means of clips 41 (which may be three or four in number, spaced circumferentially of this tube), each of which clips has a horizontal portion 41 A seating on the upper end of the baffle and a depending finger 42 B engaging the outer wall of the baffle, so that the several fingers cooperate in centering the riser tube with respect to the baffle. With the riser tube thus supported by the baffle (which is fastened to the container bottom), the riser tube can have its end cut off square (as shown in Fig. 10) at such a spacing from the clip arms 41 A that the lower end of this tube will allow liquid to flow under it.

With the just described alternative arrangements of Figs. 9, 10 and 11, as also with the one previously described, the container and the baffle form a rigid and stationary unit. At the same time, the receptacle and the heater-housing riser tube 15 (together with the thermostatic valve and the guide funnel) form a second unit which is bodily detachable from the said stationary unit, to permit a convenient cleaning of all parts. The riser tube 15 and the baffle 17, although respectively parts of the stationary and the detachable unit, cooperate in constituting partitioning means operatively interposed between the bottom of the receptacle and the bottom of the container, for compelling the liquid fed out of the receptacle to flow past the heater and thereafter upwards before being discharged into the hot-liquid storing space C. In practice, I preferably make the total cross-sectional area of the hot water passages P a minor fraction of cross-section of the bore of the riser tube 15, and also make the baffle tube 17 about twice as tall as the portion of the heating member within the container, but these proportions may be varied considerably.

So also, when the riser passages P for guiding the hot water upwardly from the bottom of the riser tube 15 are formed by upright grooves, it is immaterial whether these grooves are on the inner or the outer of the two members which afford the walls of the passages. Thus, Fig. 13 is a fragmentary horizontal section, allied to a portion of Fig. 4, showing the use of an ungrooved cylindrical baffle tube 57. In this case the heater-housing riser tube 55 is generally cylindrical and slidably insertable in the baffle tube, and is provided with upright grooves 58 which face the baffle tube to afford the passages P. These grooves extend somewhat higher than the baffle tube, as shown in Fig. 14 to permit the hot water to discharge from the said passages over the top of the baffle tube as shown by the dotted arrows in Fig. 14.

In using my appliance for supplying available boiled and de-aerated water, the bellows or other thermostatic valve-controlling member desirably is adjusted to open at about 220 degrees Fahrenheit (or somewhat above the boiling point of the water), while the thermostatic switch is adjusted to open the heater circuit at about 200 degrees.

Moreover, while my liquid heater is particularly suited for use in heating beverage waters, I do not wish to be limited in this respect, since its novel features should be equally applicable for heating other liquids when the needed adjustment is made according to the boiling point of the liquid and the desired temperature of the stored hot liquid.

I claim as my invention:

1. A liquid heater comprising a container affording a hot-liquid storage chamber, a liquid-receiving receptacle disposed within the container with the bottom of the receptacle at higher elevation than the bottom of the said chamber, the receptacle having a discharge outlet in its bottom; a heating member below the said outlet; confining means housing the liquid after its emission from the receptacle through the said outlet to compel that liquid to flow over the heating member, and guide means disposed for confining the liquid after it has passed the heating member and for guiding this liquid upwardly so as to discharge the heated liquid into the said chamber at an elevation considerably above the bottom of that chamber.

2. A liquid heater as per claim 1, in which the confining means are sealed to the receptacle and in which the effective opening of the receptacle outlet is of relatively small cross-section with respect to the total cross-sectional area of the upwardly guided liquid, whereby the said sealing and the said relative cross-sections cooperate to cause vapor pressure within the confining means to force liquid upwardly within the guide means.

3. A liquid heater as per claim 1, in which the confining means comprise a riser tube sealed at its upper end to the receptacle, and in which the guide means comprise means affording upright passageways along the riser wall of the said tube.

4. A liquid heater as per claim 1, in which the confining means comprise a riser tube sealed at its upper end to the receptacle, and in which the guide means comprise means affording upright passageways along the riser wall of the said tube, the heating member being disposed within the said tube and freely spaced from the bore of that tube.

5. A liquid heater as per claim 1, in which the confining means comprise a riser tube sealed at its upper end to the receptacle, and in which the guide means comprise a relatively shorter tube having its major portion concentric with and slidably fitting the riser tube, one of the said tubes having upright grooves facing the other tube to afford passageways for upwardly guiding liquid after the liquid has passed the heating member.

6. A liquid heater as per claim 1, in which the confining means comprise a riser tube sealed at its upper end to the receptacle, and in which the guide means comprise a relatively shorter tube having its major portion slidably fitting the riser tube, one of the said tubes having upright grooves facing the other tube to afford passageways for the flow of liquid after it has passed the heating member, the said two tubes being respectively secured to the container and to the receptacle.

7. A liquid heater as per claim 1, including an upright funnel supported within the confining means between the said outlet and the heating member and disposed for compelling the liquid, after its initial discharge from the said outlet, to flow upon the top of the heating member.

8. A liquid heater as per claim 1, including means for controlling the discharge of liquid from the outlet of the receptacle in response to the temperature within the confining means.

9. A liquid heater comprising an upright container, a cold-liquid-receptacle disposed within the container and elevated above the bottom of the container, the receptacle having a discharge outlet in its bottom; upright partitioning means interposed between the bottom of the container and the bottom of the receptacle; the partitioning means being constructed to afford an upright tubular compartment into which the said outlet opens, and one or more passageways leading upwards from the lower end of the said compartment; and a heating member disposed within the lower portion of the said compartment; the total cross-sectional area of the passageways being a minor fraction of the cross-sectional area of the said compartment.

10. A liquid heater comprising a container, a riser tube disposed within the container and affording a liquid passage from its lower end to the part of the container radially outward of said tube, a liquid receptacle overlying the upper end of the riser tube and having a bottom discharge outlet opening into said tube, a movable valve member controlling the port, thermostatic means disposed within the riser tube and connected to the valve member for moving that member in response to temperature changes within the tube, and a heating member disposed within the tube below the thermostatic means.

11. A liquid heater as per claim 10, including means responsive to the temperature of liquid in the radially outer lower portion of the container for interrupting the action of the heating whenever the said liquid temperature exceeds a certain degree.

12. A liquid heater as per claim 10, including an upright baffle associated with the riser tube and affording riser passages connected at their lower ends to the interior of the riser tube, the baffle being sealed at its lower end to the bottom of the container and having its upper end spaced downward from the bottom of the receptacle.

13. A liquid heater as per claim 10, in which the thermostatic means are supported by the riser tube and in which the valve member is supported by the thermostatic means.

14. A liquid heater as per claim 10, including means within the riser tube between the valve member and the heating member for guiding the liquid so as to flow upon the top of the heating member.

15. A liquid heater comprising an upright container having a discharge outlet adjacent to its bottom; partitioning means dividing the lower part of the container into an annular hot-liquid storing chamber and a central portion in which liquid is heated; a receptacle for cold liquid disposed at higher elevation than the bottom of the said chamber and having a receptacle discharge outlet opening into the said central portion; a valve controlling the last named outlet; an electric heating member within the said central portion for heating the liquid after it has flowed past the valve; the partitioning means affording means for guiding the heated liquid upwardly and thereafter discharging this liquid into the said chamber; a current supply circuit connected to the heating member, and a normally closed thermostatic switch in the said circuit in series with the heating member, the switch being in heat-conducting relation to liquid in the said annular chamber and arranged for opening the said circuit when the liquid in the said chamber is above a predetermined temperature.

16. A liquid heater as per claim 15, in which the thermostatic switch is disposed exteriorly of the container adjacent to the riser wall of the container and approximately at the level of the said discharge outlet of the container.

17. A liquid heater comprising a container; a cold-liquid-receiving receptacle disposed in the upper portion of the container; two concentric upright tubes underhanging the receptacle and having portions thereof relatively spaced, the outer tube being sealed at its lower end to the bottom of the container and having its upper end spaced from the receptacle; the inner tube having its lower end arranged to permit liquid to flow from the inner to the outer tube, and the bottom of the receptacle having a discharge port leading to the bore of the inner tube; a thermostatic valve responsive to temperature within the inner tube and controlling the said port; and a heating member supported by the bottom of the container and disposed within the inner tube.

18. A liquid heater as per claim 17, in which the container and the outer tube constitute a rigid unit, and in which the receptacle and the inner tube constitute a second unit bodily detachable from the aforesaid unit; the said two units having relatively interengageable portions normally holding the two tubes substantially coaxial.

19. In a liquid heater, a container having an outlet in its lower portion, a cold-liquid receptacle disposed within the container and having its bottom at higher elevation than the bottom of the container, the receptacle having a discharge outlet in its bottom; a valve controlling the port, thermostatic means underhanging the receptacle and supporting the valve, an electric heating member disposed within the container below the thermostatic means; and generally tubular partitioning means for compelling liquid issuing from the said discharge outlet of the receptacle to flow downward past the heating member and thereafter upwards before this liquid can reach the part of the container from which the container outlet leads, the thermostatic means being disposed within the partitioning means and spaced upwardly from the heating member.

20. A liquid heater as per claim 19, in which the partitioning means include a portion sealed to the receptacle, whereby the said portion and the receptacle constitute a unit manually detachable from the container, and in which the thermostatic means are supported by the said unit.

21. A liquid heater as per claim 19, in which the lower portion of the side wall of the receptacle is normally within and separated by an annular space from the riser wall of the container so as to permit heated liquid to rise within the said space to a common level with liquid in the receptacle.

22. A liquid heater comprising an upright container, a cold-liquid-receiving receptacle disposed within the container with the bottom of the receptacle spaced upwardly from the bottom of the container; generally tubular partitioning means interposed between the bottom of the container and the bottom of the receptacle, the partitioning means subdividing the portion of the container below the receptacle into a heating compartment and hot-liquid storing chamber; the receptacle having a discharge outlet opening into the upper portion of the heating compartment, and the partitioning means having a portion thereof affording a passageway leading upward from the lower portion of the heating compartment to an elevation below the bottom of the receptacle; a heating member disposed within the lower portion of the heating compartment; and a valve controlling the discharge of liquid from the receptacle into the heating compartment through the said outlet, the valve having no passage therein of sufficient size to permit vapor generated within the said compartment to bubble through liquid in such passage into the receptacle, so that the pressure of such vapor will force heated liquid up the said passageway in the partitioning means.

23. In a liquid heater of the type in which cold liquid flows past from a cold-liquid receptacle past a heating member to a hot liquid-storing chamber, partitioning means interposed between the receptacle and the said chamber for confining liquid vapor below the receptacle, and a valve controlling the discharge of cold liquid from the receptacle into the space in which the vapor is confined; the valve having no passage therein of sufficient cross-section to permit vapor to bubble through liquid in such passage into the receptacle, so that the pressure of such vapor will force heated liquid into the said chamber.

24. In a liquid heater, an assemblage of elements as per claim 23, and thermostatic means controlling the said valve, the thermostatic means being responsive to the temperature within the space in which the vapor is confined.

LEE B. GREEN.